United States Patent Office 3,225,137
Patented Dec. 21, 1965

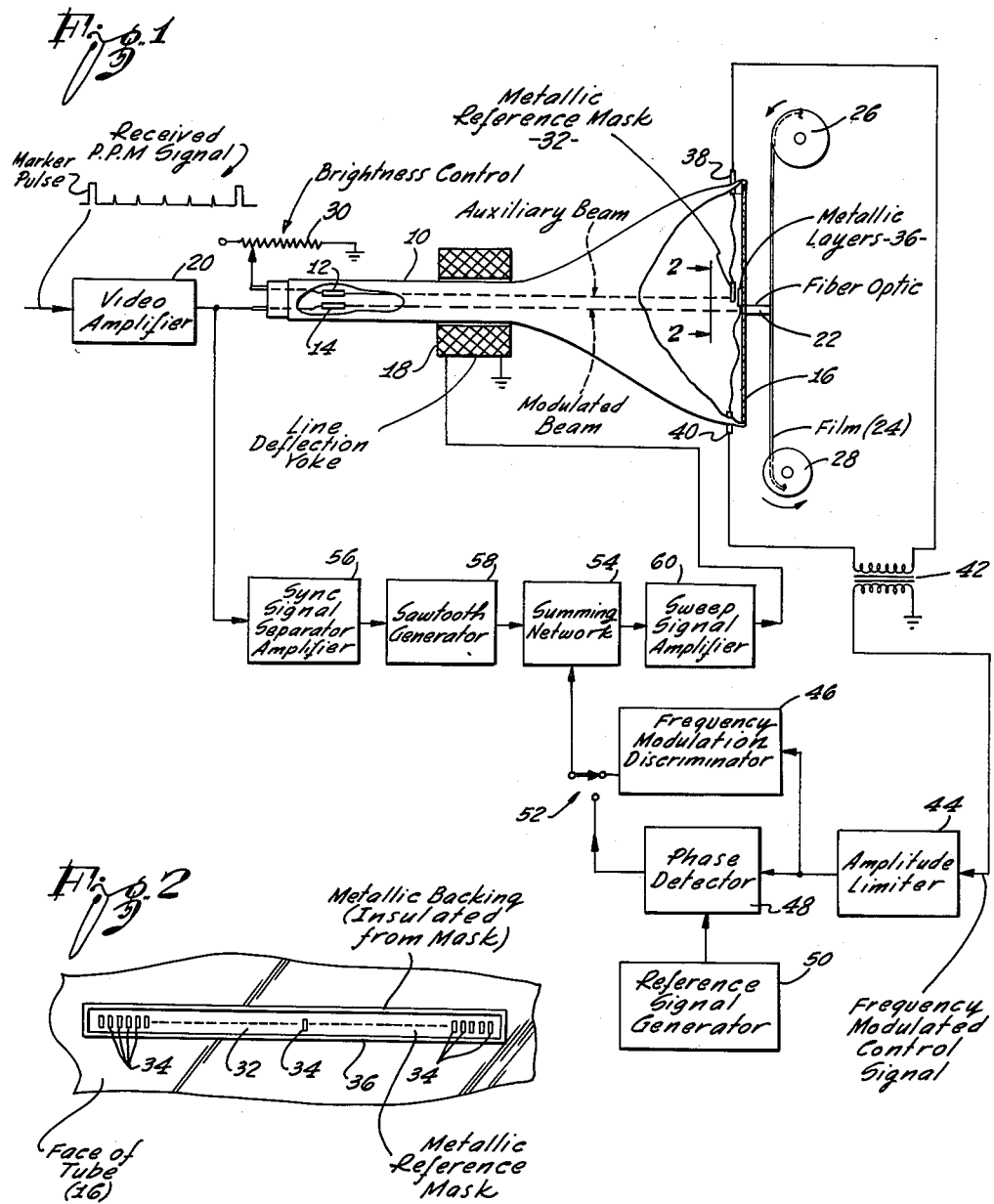

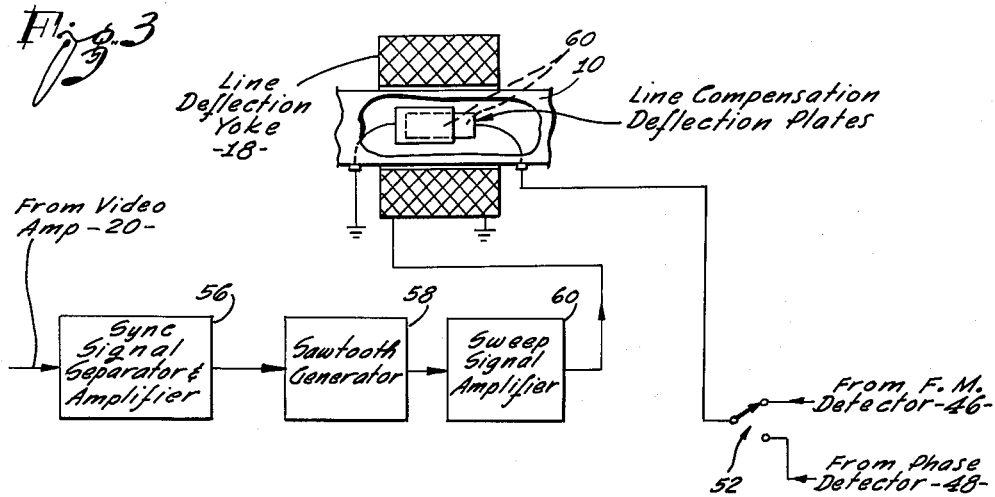
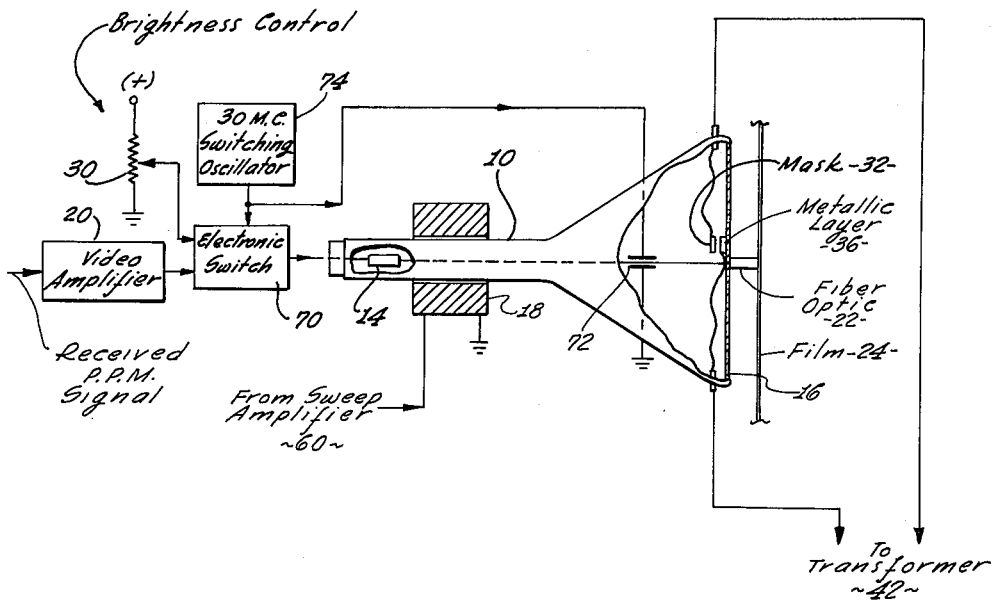

3,225,137
CATHODE-RAY DISPLAY SYSTEM
Wayne R. Johnson, Los Angeles, Calif., assignor to Winston Research Corporation, Beverly Hills, Calif., a corporation of California
Filed July 23, 1962, Ser. No. 211,647
5 Claims. (Cl. 178—6.7)

The present invention relates to cathode-ray display systems and apparatus, and it relates more particularly to such systems and apparatus for use in the detection and display of pulse position modulation information.

Pulse position modulation is the modulation of a pulse carrier wherein the value of each instantaneous sample of a modulating wave varies the position in time of a pulse relative to its unmodulated time of occurrence. The exact displacement of the pulse from its unmodulated position is proportional to the instantaneous magnitude of the modulating information. All the pulses are of constant amplitude and of constant duration in the usual pulse position modulation system.

In the transmission of pulse position modulation information, several channels of information may be communicated at the same time. Each separate channel is represented by a different channel pulse, and the individual channel pulses change in position with respect to a common synchronizing or marker pulse as each of the different sets of information represented by the different channel pulses changes from instant to instant. The function of the marker pulse is to control the timing of the receiving equipment.

The received pulse position modulation signal can be detected and displayed by means, for example, of a cathode-ray display tube. When such a display tube is used, the received information is displayed across its display screen, with each different channel being represented by a spot which varies in position on the screen in accordance with instantaneous changes in the corresponding information.

In the usual prior art cathode-ray tube display systems for receiving and detecting pulse position modulation signals, the received pulse position modulated signal is introduced to the control grid of a cathode-ray tube and is used to modulate the intensity of the cathode-ray beam therein. The line scan, for example, of the cathode-ray beam is synchronized with the pulse position modulation signal, so that the position of illuminated spots across the display screen represents the position of the different channel pulses.

It is also usual in the prior art display systems for the spots illuminated on the display screen of the cathode-ray tube to be projected through an appropriate lens system onto a moving film. This results in different traces on the film respectively representing the different sets of information.

The accuracy of the prior art cathode-ray tube systems for displaying pulse position modulation information is limited. This limitation is to such an extent that the prior art systems are inadequate for most purposes in which the pulse position modulation information is to be recovered and displayed with any degree of accuracy.

An important object of the invention is to provide an improved cathode-ray tube display system and apparatus of the type under consideration, in which the accuracy of the recovery of the information is drastically and materially improved so that the system may be used in any application in which pulse position modulation information is to be accurately recovered and displayed with a high degree of precision.

Another object of the invention is to provide such an improved cathode-ray display system and apparatus in which a high degree of accuracy is obtained without adding materially to the complexity of the system, as compared with the prior art systems of the same general type.

The improved cathode-ray display system of the invention, in the embodiments to be described, utilizes a fiber optic mounted on the display screen externally of the cathode-ray tube. The fiber optic serves to project the illuminated spots displayed on the display screen onto a moving film strip. This fiber optic replaces the usual complicated and expensive lens systems of the prior art, and it serves to improve the writing speed of the equipment. Appropriate fiber optics for this purpose are manufactured, for example, by the Chicago Aerial Industries, Inc., of Barrington, Illinois; and by the Mosaic Fabrications, Inc., of Southbridge, Massachusetts.

In the practice of the invention, an apertured reference mask, or grating, of conductive material is placed above the line trace of the cathode-ray beam; and the modulated cathode-ray beam, or an auxiliary beam, is caused to recurrently scan the mask.

The reference mask may be made, for example, by ruling a precision master grating of a desired length and width. The master grating may be contact printed to a glass working master, and a metallic mask may be derived from the contact print by usual photographic and etching techniques. The resulting metallic reference mask has a series of slots formed in it, so that it has a desired grating configuration.

Also in the practice of the invention, a conductive member, such as an aluminized layer, is deposited on the inner surface of the display screen of the cathode-ray tube behind the metallic grating mask to be masked thereby. The conductive layer is spaced and insulated from the mask. Then, as the beam is scanned across the grating mask, it alternatively strikes the mask and the conductive layer.

A control signal is derived from the conductive mask and the conductive layer which has a constant frequency so long as the scan of the beam is constant. This constant frequency of the derived signal is obtained by placing the slots in the mask grating at precisely measured identical spacings along the length of the mask. Then, any variation in the scanning speed of the beam produces a frequency modulation in the derived signal.

The frequency modulation component of the derived signal is detected in the system of the invention, and a signal is produced which is used to control the scanning speed of the beam so as to hold the scanning speed precisely constant.

It will become evident as the description proceeds that structures equivalent to the conductive mask and layer may be used to produce the control signal having a frequency indicative of the scanning speed of the beam.

For example, a series of mutually insulated conductive elements may be provided across the face of the cathode-ray tube to be scanned by the beam. Then by interconnecting alternate ones of the elements to the opposite sides of an external circuit, the above-mentioned control signal may be derived.

Furthermore, phosphor dots may be used to replace the series of conductive elements referred to in the preceding paragraph, and suitably positioned photocells may be optically coupled thereto to derive the desired control signal as the dots are recurrently scanned by the beam.

It is evident that any spurious variation in the beam scanning speed of the above-described cathode-ray display system would produce a corresponding spurious change in the position of the displayed spots, representing the pulse position modultion information. Therefore, the improved display system of the invention, in which the cathode-ray beam scanning speed is held precisely constant, is capable of displaying the pulse position modulation information with a high degree of precision, as compared with the prior art systems. This is because any variations in the position of the individual spots on the display screen represents changes in the actual information itself, rather than spurious variations in the scanning speed of the cathode-ray beam.

The features of the invention which are believed to be new are particularly set forth in the accompanying claims. The invention itself, however, together with further objects and advantages thereof, may best be understood by reference to the following description, when taken in conjunction with the accompanying drawings, in which:

FIGURE 1 is a schematic diagram illustrating, partially in block form, the various components which cooperate to make up one embodiment of the improved pulse position modulation display system of the invention;

FIGURE 2 is a representation of a grating mask and associated conductive layer incorporated in the display system of FIGURE 1, as viewed along the lines 2—2 of FIGURE 1;

FIGURE 3 is a fragmentary diagrammatic representation of a modification to the system of FIGURE 1 representative of a second embodiment of the invention; and FIGURE 4 is a fragmentary schematic representation of a further modification to the system of FIGURE 1 and representative of a third embodiment of the invention.

The various individual known electrical circuits incorporated in the illustrated systems of the invention are shown in block form. It is belived that the individual circuits of the electrical components are so well known that a detailed explanation of the individual circuits is unnecessary herein. This is especially so because the invention is not concerned with the actual circuitry in any of the electrical components.

The cathode-ray display system of FIGURE 1 includes a cathode-ray tube 10. The cathode-ray tube 10 may be of any known construction. For the display purposes of the present invention, the different channel pulses of the received pulse position modulation signal are displayed along the horizontal or line axis of the display screen of the cathode-ray tube 10, so that the vertical dimension of the display screen may be maintained at a minimum.

The cathode-ray tube 10 in FIGURE 1 includes a pair of electron guns 12 and 14 which produce corresponding cathode-ray beams, and which directs the beams along adjacent paths to the display screen 16 of the tube. An electromagnetic line deflection yoke 18 is provided, and this yoke responds to the usual sawtooth line deflection signals to recurrently scan the cathode-ray beams in the line direction across the display screen 16. Although an electro-magnetic line deflection yoke is shown in FIGURE 1, electrostatic elements may be used for the line deflection purposes, if so desired.

The electron gun 14 produces a first cathode-ray beam which is modulated by the received pulse position modulation signal. This received signal is amplified in a video amplifier 20, and the video amplifier applies the amplified signal to the control electrode in the electron gun 14 to produce the desired intensity modulation on the corresponding cathode-ray beam.

A fiber optic 22 is mounted on the external surface of the display screen 16 of the cathode-ray tube 10, and this fiber optic extends across the screen in the line direction over the portion scanned by the modulated beam.

The received pulse position modulation signal causes the modulated beam in the cathode-ray tube 10 to exhibit illuminated spots at spaced positions along the line trace across the display screen 16, and these spots are projected by the fiber optic 22 onto a film strip 24. The film strip is mounted on a suitable, known mechanism which causes it to be drawn from a reel 26 onto a reel 28 across the surface of the fiber optic 22. The resulting information displayed as moving illuminated spots on the screen 16 of the cathode-ray tube 10 appears as separate traces along the film strip 24, with the line-dimension variations in position of each trace representing corresponding variations of the different channel pulses of the received pulse position modulation signal.

The electron gun 12 in the cathode-ray tube 10 produces an unmodulated auxiliary beam which, as mentioned, is directed to the display screen 16 along a path adjacent the modulated beam. However, the auxiliary beam impinges on the display screen at a position displaced from the optical axis of the fiber optic 22, so that any illumination produced by the auxiliary beam is not projected onto the film strip 24.

The control electrode of the electron gun 12 is connected, for example, to the movable arm of a potentiometer 30. The potentiometer 30 is connected between the positive terminal of a direct current potential source and ground, and this potentiometer serves as a brightness control for the unmodulated, auxiliary beam.

The unmodulated, auxiliary beam is recurrently scanned with the modulated beam in the line direction back and forth across the display screen 16. An apertured, electrically conductive, metallic reference mask 32 is positioned in the path of the auxiliary beam, so that the mask is recurrently scanned by the auxiliary beam, as the two beams are swept back and forth across the display screen 16 by the deflection yoke 18.

The metallic reference mask 32 has a grating configuration, as mentioned above, and it may be fabricated by any known process, including the technique suggested previously herein. The mask 32 has a series of slots 34 extending along its length, the slots being precisely positioned to be spaced exactly equidistantly from one another.

A metallic layer 36 is formed on the inner surface of the display screen 16 behind the mask 34 to be masked thereby. The metallic layer 36 may, for example, be an aluminized layer, and it may be deposited on the screen 16 in accordance with usual known practices.

As the auxiliary beam is scanned across the screen 16, it alternately impinges on the conductive mask member 32 and on the conductive layer 36; the impingement of the beam on the conductive layer occurring when the auxiliary beam passes through the slots 34.

The electrically conductive reference mask 32 is connected to a terminal 38, and the metallic layer 36 is connected to a terminal 40 on the envelope of the cathode-ray tube 10. The mask 32 is insulated from the conductive layer 36, so that a signal is set up across these terminals as the mask and layer are scanned by the auxiliary beam.

The primary winding of a step-up transformer 42 is connected to the terminals 38 and 40, and the above-mentioned signal is applied across the primary winding. The secondary winding of the transformer has one side connected to ground. This results in a high-voltage, ground-referenced signal appearing across the secondary winding of the transformer 42. The secondary signal has a constant frequency, due to the precise equal spacing of the slots 34 in the reference mask 32, so long as the scanning speed of the two beams in the cathode-ray tube 10 remains constant. However, any spurious variation in the scanning speed of the two beams produces a corresponding frequency modulation in the signal produced across the secondary of the transformer 42.

The above-mentioned secondary signal is applied to an amplitude limiter stage 44 which, in turn, is connected to a frequency modulation discriminator detector 46 and to a phase detector 48. If so desired, either one of the networks 46 or 48 may be used alone. A reference signal generator 50 is coupled to the phase detector 48, and the reference signal introduces a constant frequency signal to the phase detector which corresponds to the unmodulated frequency of the control signal from the transformer 42. A selective switch 52 applies either the output from the frequency discriminator 46 or from the phase detector 48 to a summing network 54.

The video amplifier 20 is also connected to a synchronizing signal separator and amplifier stage 56 which serves to remove the synchronizing signal components from the received pulse position modulation signal. These synchronizing signal components are introduced to a sawtooth generator 58 which responds thereto to generate a line sawtooth sweep signal synchronized with the received pulse position modulation signal.

The line sawtooth sweep signal from the generator 58 is applied to the summing network 54 in which it is modulated by the control signal derived from the frequency discriminator 46 or from the phase detector 48. The resulting composite signal is amplified in a sweep signal amplifier 60 and introduced to the line deflection yoke 18.

Therefore, the system described above serves to cause the modulated and auxiliary beams in the cathode-ray display tube 10 to be deflected across the screen 16 in synchronism with the received pulse position modulation signal. During each recurrent deflection of the modulated beam across the display screen 16, the intensity of the beam is modulated by the channel pulses in the received signal, so that corresponding illuminated spots appear across the display screen. These illuminated spots are projected through the fiber optic 22 onto the film strip 24.

As noted above, any tendency for the beam scanning speed to vary would produce spurious shifts in the position of the illuminated spots on the display screen 16, which, in turn, would produce spurious variations in the information recorded on the film strip 24.

Such variations in the deflection speed of the modulated beam in the cathode-ray tube 10 are prevented by the signal generated by the engagement of the auxiliary beam with the reference mask 32 and conductive layer 34. The generated signal is either phase-detected by the components 48 and 50, or frequency-detected by the discriminator 46, to produce a control signal having amplitude variations corresponding to the frequency variations in the generated signal. The amplitude-varying control signal is used to modulate the sawtooth line sweep signal so as to produce corresponding compensations in the deflection speed of the beams, as they are scanned across the display screen 16.

If so desired, the system of FIGURE 1 can be simplified to use a single beam, rather than two beams. In such an embodiment, the modulated beam produced by the gun 14 is made astigmatic vertically so that it will impinge, not only on the portion of the display screen 16 adjacent the fiber optic 22, but also on the reference metallic mask 32.

In this latter embodiment, the modulated beam is controlled so that it is not entirely cut off during the intervals between the modulation thereof by successive channel pulses. Then, the modulated beam is capable of producing a continuous frequency modulated signal at the primary of the transformer 42. Any modulations on the frequency modulated signal produced by the intensity modulation of the beam by the channel pulses is removed by the amplitude limiter 44. The characteristics of the film strip 24 may be such that the film is not exposed by the modulated beam in the intervals between the channel pulses, although the modulated beam would produce some illumination on the display screen 16 during such intervals.

In the embodiment of FIGURE 3, the detected control signal from the switch 52, instead of being applied to the summing network 54 in the system of FIGURE 1, is applied across a pair of electrostatic line deflection elements 60. In this latter embodiment, the sawtooth signal from the sawtooth generator 58 is applied directly to the sweep signal amplifier 60 for application to the line deflection yoke 18.

When electrostatic deflection elements are used to replace the line deflection yoke 18, some problems arise. These problems occur because of the voltage requirements of the electrostatic deflection systems; and because the electrostatic deflection systems tend to distort the circular cross-section of the beam, this distortion increasing with the angle of deflection. The characteristics tend to limit the electrostatic deflection of the cathode-ray beam in practical applications to around 15°. However, the electrostatic deflection system is advantageous over the electro-magnetic type because of the wide frequency range over which the electrostatic system can operate. The band-pass of the electrostatic deflection system is limited only by the amount of power which can justifiably be expended in achieving the desired display brightness and size.

The favorable characteristics of both the electrostatic and the electro-magnetic types of deflection systems are used to advantage in the embodiment of FIGURE 3. This embodiment uses electro-magnetic deflection to deflect the beam across the display screen, as exemplified by the line deflection yoke 18 which responds to the line sweep signal from the amplifier 60; and it uses electrostatic deflection to impart the speed compensating controls to the beam, as exemplified by the line electrostatic deflection elements 60 which respond to the control signal from the selector switch 52.

In the embodiment shown in FIGURE 4, an electronic switch 70 is interposed between the video amplifier 20 and brightness control potentiometer 30 on one hand, and the electron gun 14 on the other hand. A single beam is used in the embodiment of FIGURE 4, and this beam is periodically shifted between the reference mask 32 and the portion of the display screen 16 corresponding to the fiber optic 22. This shifting of the beam is effectuated by periodically deflecting the beam in a direction perpendicular to the line scan.

The above-mentioned periodic deflection of the cathode-ray beam in FIGURE 4 may be carried out, for example, by means of a pair of electrostatic deflection elements 72 positioned in the cathode-ray tube 10. A rectangular switching signal is introduced to the plates 72 by means, for example, of a switching oscillator 74. This switching oscillator may, for example, generate a 30 megacycle signal, so that the electron beam is switched back and forth at a 30 megacycle rate. The switching oscillator 74 is also connected to the electronic switch 70 to control the switch.

The arrangement is such that the electronic switch 70 permits the pulse position modulation signal from the video amplifier 20 to be introduced to the gun 14 to modulate the cathode-ray beam in the cathode-ray tube 10 when the beam is directed to the portion of the screen 16 adjacent the fiber optic 22; and the switch 70 is controlled to cause the cathode-ray beam to have a uniform brightness, as established by the brightness control potentiometer 30, when the beam is deflected by the elements 72 to scan the mask 32.

Therefore, the system of FIGURE 4 operates in much the same manner as the system of FIGURE 1, with the exception that a single time-shared, switched cathode-ray beam is used in the embodiment of FIGURE 4, as compared with the use of a pair of beams in the embodiment of FIGURE 1.

The invention provides, therefore, an improved cathode-ray display system which is capable of displaying information with a high degree of precision, and in which the scanning speed of the display system is held precisely constant so as to preclude the introduction of spurious variations into the displayed information.

While particular embodiments of the invention have been shown and described, modifications may be made, and it is intended in the claims to cover all such modifications as fall within the spirit and scope of the invention.

What is claimed is:

1. A cathode-ray tube display system for displaying the information represented by an input signal, which input signal includes information signal components and synchronizing signal components, said display system including: a cathode-ray tube having a display screen, cathode-ray beam producing and directing means, cathode-ray beam intensity modulating means, and cathode-ray beam deflection means; first circuit means coupled to said beam modulating means and responsive to the input signal for causing the intensity of a cathode-ray beam in said tube to be modulated in accordance with the information signal components of said input signal and coupled to said deflection means and responsive to the synchronizing signal components of said input signal for causing recurrent reciprocal beam deflection of the modulated beam along a single path across said display screen in synchronism with the input signal; and electrically conductive apertured mask member positioned in said cathode-ray tube and displaced at least partially from said path to be recurrently scanned by a cathode-ray beam in said tube; a conductive member positioned in said cathode-ray tube adjacent said apertured mask member and partially masked thereby; second circuit means coupled to said mask member and to said conductive member for producing a control signal having a characteristic varying in correspondence with variations in the beam deflection speed across said display screen; and further circuit means coupled to said second circuit means and to said deflection means and responsive to said control signal for compensating for such speed variations in the beam deflection across said display screen.

2. A cathode-ray tube display system for displaying the information represented by an input signal, which signal includes information signal components and synchronizing signal components, said system including: a cathode-ray tube having a display screen, means for producing a pair of cathode-ray beams in said tube and for directing the beams along adjacent paths to said display screen, means for modulating the intensity of one of said beams, and means for deflecting both of said beams along first and second parallel lines; first circuit means coupled to said modulating means and responsive to the input signal for causing the intensity of the modulated beam in said tube to vary in accordance with the information signal components of said input signal and coupled to said deflecting means and responsive to the synchronizing signal components of said input signal for causing both said beams to be recurrently and reciprocally deflected respectively along said first and second lines across said display screen in synchronism with the input signal; an electrically conductive apertured mask member positioned in said cathode-ray tube adjacent said second line and at least partially displaced from said first line to be scanned by the unmodulated one of said cathode-ray beams; a conductive layer positioned in said cathode-ray tube on the inner surface of said display screen, said conductive layer being insulated from said apertured mask and partially masked thereby; second circuit means coupled to said mask member and to said conductive layer for producing a control signal having a characteristic varying in correspondence with variations in the speed of deflection of the beams across said display screen; and further circuit means coupled to said second circuit means and to said deflecting means and responsive to said control signal for compensating for speed variations in the deflection of the beams across the display screen.

3. A cathode-ray tube display system for displaying the information represented by an input signal, which signal includes information signal components and synchronizing signal components, said system including: a cathode-ray tube including a display screen, means for producing a cathode-ray beam in said tube and for directing the beam to said display screen, means for modulating the intensity of the beam, and means for deflecting the beam; first circuit means coupled to said modulating means and responsive to the input signal for causing the intensity of the beam to be modulated in accordance with the information signal components of said input signal and coupled to said deflecting means and responsive to the synchronizing signal components of said input signal for causing the beam to be reciprocally and recurrently deflected along a single path across said display screen in synchronism with the input signal; an electrically conductive apertured mask member positioned in said cathode-ray tube adjacent the display screen at least partially displaced from said path to be recurrently scanned by said cathode-ray beam; a conductive layer positioned in said cathode-ray tube on the inner surface of said display screen, said conductive layer being insulated from said apertured mask member and partially masked thereby; second circuit means coupled to said mask member and to said conductive member for producing a control signal having a characteristic varying in correspondence with variations in the speed of deflection of the beam across said display screen; and further circuit means coupled to said second circuit means and to said deflecting means and responsive to said control signal for compensating for speed variations in the deflection of the beam across the display screen.

4. The display system defined in claim 3 in which said cathode-ray tube includes further deflecting means for deflecting the beam in a direction perpendicular to the aforesaid deflection thereof across said display screen; and which includes further circuit means coupled to said first circuit means and to said further deflecting means for periodically deflecting said beam to said mask member and for simultaneously causing a constant intensity signal to be introduced to said modulating means as the beam is scanned across said mask member.

5. A cathode-ray tube display system for displaying the information represented by a pulse position modulated input signal, which signal includes information signal components and synchronizing signal components, said system including: a cathode-ray tube including a display screen, cathode-ray beam producing means, cathode-ray beam intensity modulating control electrode means, and beam deflection means; first circuit means coupled to said control electrode means and responsive to the input signal for causing the intensity of a cathode-ray beam in said tube to be modulated in accordance with the information signal components of said pulse position modulated input signal and coupled to said deflection means and responsive to the synchronizing signal components of said input signal for causing reciprocal and recurrent beam deflection along a single path across said display screen in synchronism with the input signal; optical lens means positioned on the portion of said display screen scanned by the modulated beam for projecting the resulting display onto a recording medium; an electrically conductive grating member positioned in said cathode-ray tube adjacent said screen and displaced from the optical axis through said optical lens to be scanned by the modulated cathode-ray beam; an electrically conductive layer positioned in said cathode-ray tube on the inner surface of said display screen, said layer being insulated from said grating member and partially masked thereby; second circuit means coupled to said grating member and to said conductive layer for producing a control signal exhibiting frequency variations corresponding to variations in the beam deflection across said display screen; and further circuit means coupled to said second circuit means and to said deflection means and responsive to said last named control signal for compensating speed variations in the beam deflection across the display screen.

References Cited by the Examiner

UNITED STATES PATENTS

| | | | |
|---|---|---|---|
| 2,862,999 | 12/1958 | Fairhurst | 178—5.4 |
| 2,871,403 | 1/1959 | Buckbee et al. | 178—5.4 |
| 3,027,219 | 3/1962 | Bradley | 178—6 |

DAVID G. REDINBAUGH, *Primary Examiner.*

JOHN A. O'BRIEN, *Assistant Examiner.*